(12) United States Patent
McKinlay et al.

(10) Patent No.: US 9,361,910 B2
(45) Date of Patent: Jun. 7, 2016

(54) LEADS COUPLED TO TOP AND BOTTOM READER STACKS OF A READER

(71) Applicant: Seagate Technology LLC, Cupertino, CA (US)

(72) Inventors: Shaun Eric McKinlay, Eden Prairie, MN (US); Eric Walter Singleton, Maple Plain, MN (US); Samuel Martin Barthell, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/323,119

(22) Filed: Jul. 3, 2014

(65) Prior Publication Data

US 2016/0005425 A1 Jan. 7, 2016

(51) Int. Cl.

| | | |
|---|---|---|
| *G11B 5/39* | (2006.01) |
| *G11B 5/115* | (2006.01) |
| *G11B 5/29* | (2006.01) |
| *G11B 5/265* | (2006.01) |
| *G11B 5/11* | (2006.01) |

(52) U.S. Cl.
CPC ........ *G11B 5/115* (2013.01); *G11B 5/11* (2013.01); *G11B 5/265* (2013.01); *G11B 5/2652* (2013.01); *G11B 5/29* (2013.01); *G11B 5/3912* (2013.01); *G11B 5/3948* (2013.01); *G11B 5/3958* (2013.01)

(58) Field of Classification Search
CPC .......... G11B 5/33; G11B 5/39; G11B 5/3903; G11B 5/3906; G11B 5/3912; G11B 5/3945; G11B 5/3948; G11B 5/3951; G11B 5/3958; G11B 5/3961; G11B 5/3964; G11B 5/11; G11B 5/115; G11B 5/265; G11B 5/2652

USPC .......... 360/314, 315, 316, 319, 322
See application file for complete search history.

(56) References Cited

U.S. PATENT DOCUMENTS

| | | | |
|---|---|---|---|
| 6,819,530 B2 | 11/2004 | Gill | |
| 7,408,730 B2 | 8/2008 | Yamagishi | |
| 7,436,632 B2 | 10/2008 | Li et al. | |
| 8,243,398 B2 | 8/2012 | Partee et al. | |
| 8,786,987 B2 | 7/2014 | Edelman et al. | |
| 8,824,106 B1* | 9/2014 | Garfunkel et al. | 360/316 |
| 8,873,204 B1* | 10/2014 | Gao et al. | 360/319 |
| 8,891,207 B1 | 11/2014 | Li et al. | |
| 8,908,333 B1 | 12/2014 | Rudy et al. | |
| 8,970,988 B1 | 3/2015 | Li et al. | |
| 9,042,058 B1 | 5/2015 | Li et al. | |

(Continued)

OTHER PUBLICATIONS

Van Dijken et al., "IrMn as exchange-biasing material in systems with perpendicular magnetic anisotropy", Journal of Applied Physics, vol. 97, 2005, pp. 10K114-1-10K114-3.

(Continued)

*Primary Examiner* — Jefferson Evans
(74) *Attorney, Agent, or Firm* — Hollingsworth Davis, LLC

(57) ABSTRACT

A reader includes top and bottom reader stacks that are offset relative to each other in a downtrack direction and disposed between a top shield and a bottom shield. Top side shields surround the top reader stack in a crosstrack direction, and bottom side shields surround the bottom reader stack in the crosstrack direction. A middle shield is between the top and bottom reader stacks and the top and bottom side shields. The middle shield includes a common electrical conductive path coupled to the top and bottom reader stacks. A middle lead is coupled to an edge of the middle shield.

19 Claims, 6 Drawing Sheets

(56) References Cited

U.S. PATENT DOCUMENTS

| | | | |
|---|---|---|---|
| 9,042,059 B1 * | 5/2015 | Katine | G11B 5/3909 360/316 |
| 9,087,527 B1 | 7/2015 | Li et al. | |
| 9,099,125 B1 * | 8/2015 | Hattori | G11B 5/3912 |
| 9,190,082 B2 | 11/2015 | Sapozhnikov et al. | |
| 2003/0151855 A1 | 8/2003 | Molstad et al. | |
| 2011/0069413 A1 | 3/2011 | Maat et al. | |
| 2011/0134572 A1 | 6/2011 | Qiu et al. | |
| 2012/0307404 A1 | 12/2012 | Braganca et al. | |
| 2013/0265039 A1 | 10/2013 | Cai et al. | |
| 2013/0286502 A1 | 10/2013 | Erden et al. | |
| 2013/0286511 A1 | 10/2013 | Edelman et al. | |
| 2014/0119106 A1 | 5/2014 | Lee et al. | |
| 2015/0062735 A1 * | 3/2015 | Sapozhnikov | G11B 5/115 360/46 |
| 2015/0062755 A1 * | 3/2015 | Sapozhnikov | G11B 5/3951 360/235.4 |
| 2015/0170678 A1 * | 6/2015 | Mastain | 360/128 |
| 2015/0255092 A1 * | 9/2015 | Macken | G11B 5/3951 360/324 |
| 2015/0269956 A1 * | 9/2015 | Isowaki | G11B 5/3954 360/46 |
| 2016/0005424 A1 * | 1/2016 | McKinlay | G11B 5/29 360/121 |

OTHER PUBLICATIONS

File History for U.S. Appl. No. 14/192,467.
File History for U.S. Appl. No. 14/323,027.

* cited by examiner

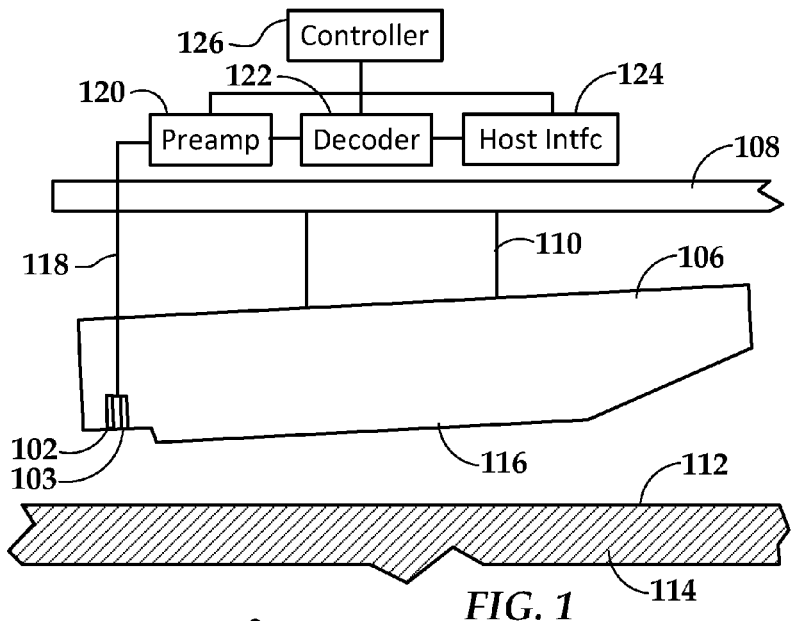
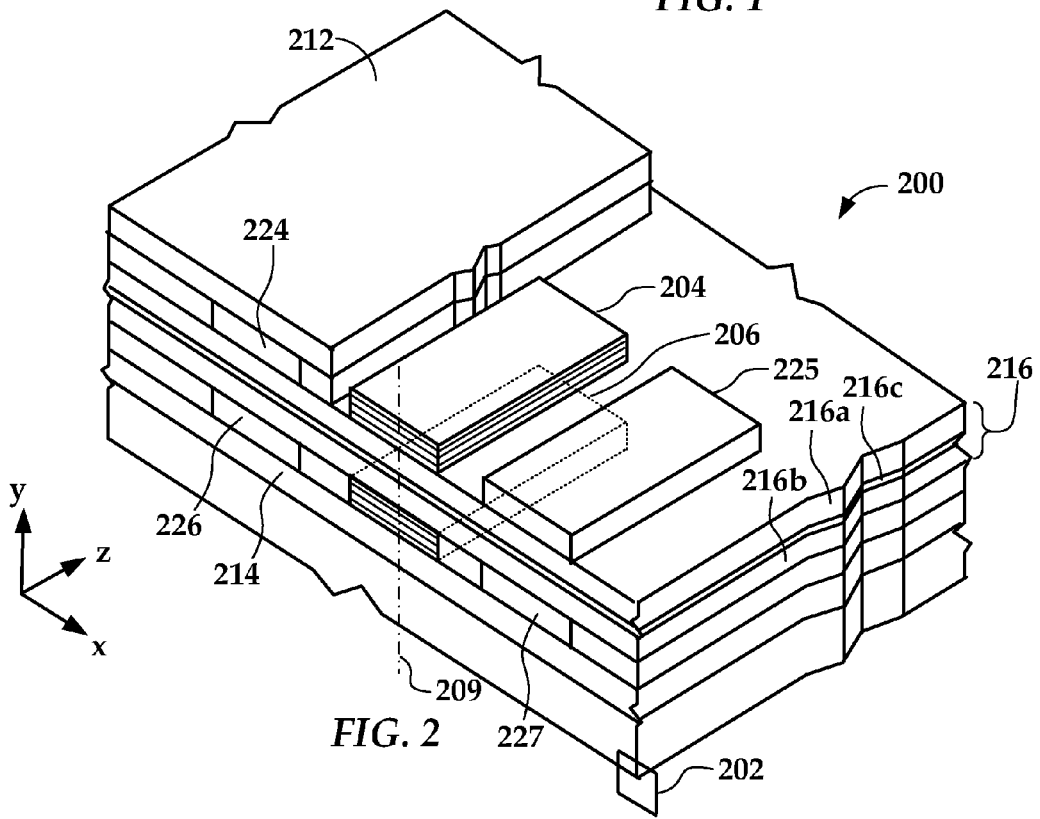

LEADS COUPLED TO TOP AND BOTTOM READER STACKS OF A READER

SUMMARY

The present disclosure is related to leads coupled to top and bottom reader stacks of a reader. In one embodiment, a reader includes top and bottom reader stacks that are offset relative to each other in a downtrack direction and disposed between a top shield and a bottom shield. Top side shields surround the top reader stack in a crosstrack direction, and bottom side shields surround the bottom reader stack in the crosstrack direction. A middle shield is between the top and bottom reader stacks and the top and bottom side shields. The middle shield includes a common electrical conductive path coupled to the top and bottom reader stacks. A middle lead is coupled to an edge of the middle shield.

In another embodiment, a reader includes first and second reader stacks that are offset relative to each other in a downtrack direction and disposed between a first shield and a second shield. First side shields surround the first reader stack in a crosstrack direction, and second side shields surround the second reader stack in the crosstrack direction. A split middle shield is between the first and second reader stacks and the first and second side shields. The split middle shield includes first and second portions coupled respectively to the first and second reader stacks and an isolation layer therebetween. First and second middle leads are coupled to substrate parallel surfaces of the first and second portions of the split middle shield.

In another embodiment, a method involves positioning top and bottom reader stacks of a reader between a top and bottom shield. The top and bottom reader stacks are offset relative to each other in a downtrack direction At least one of the top and bottom reader stacks are magnetically biasing via top and bottom side shields that surround the respective top and bottom reader stacks in a crosstrack direction. A preamplifier is coupled to the top and bottom reader stacks via top and bottom leads coupled to the top and bottom shields. The preamplifier is further coupled via at least one middle lead coupled to a middle shield located between the top and bottom reader stacks and the top and bottom side shields.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

FIG. 1 is a block diagram of an apparatus according to an example embodiment;

FIG. 2 is a perspective view of a reader according to an example embodiment;

DETAILED DESCRIPTION

Figure 3:
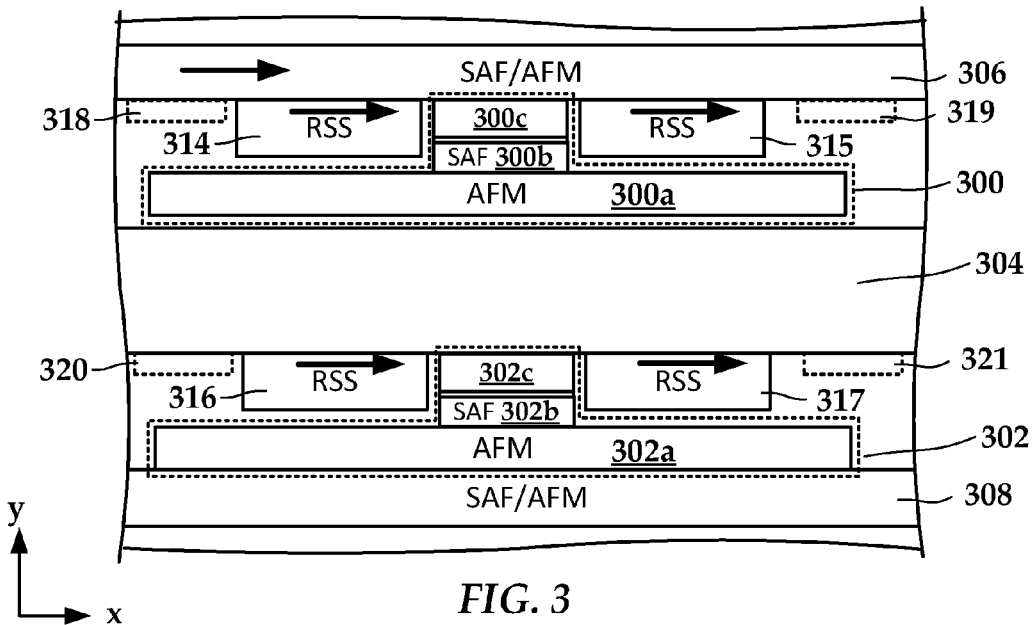
FIG. 3 is media-facing-surface view of a reader according to an example embodiment.

Magnetic recording devices such as hard disk drives utilize magnetic read/write heads that are held close to the surface of a spinning magnetic disk. The read/write head includes a write transducer that causes a change in magnetic orientation of bits within tracks on the disk. The read/write head also includes a read transducer follows the tracks and generates a signal based on variations in magnetic field. These signals are used to read the bits.

Most hard disk drives utilize a single read and write transducer per read/write head. There may be multiple read/write heads in a hard disk drive, e.g., one for each surface of each disk in the drive. In order to increase data density, it is envisioned that two or more read transducers and/or write transducers may be included within each read/write head. While there are challenges in increasing the number of transducers in the read/write head, this strategy may help sustain the current rate of areal density increase in the short term.

The present disclosure is related to systems, methods, and apparatuses utilizing magnetic readers with multiple read sensors for reading magnetic recording media, e.g., hard disks. Generally, current hard disk devices utilize a read/write head (also referred to as a slider) with a single read transducer for reading data. Multiple read/write heads may be used, e.g., separate read/write heads positioned at top and bottom surfaces of one or more magnetic disks. New architectures are being proposed that use more than one read transducer per read/write head. These new architectures use multiple transducers to read data that are recorded on a magnetic recording media at an increased areal density and/or increased data rate compared to current recording architectures (e.g., using a single read transducer). These architectures may also employ multiple writers on a single read/write head.

Details of a multi-reader device according to an example embodiment are shown in FIG. 1. The components shown in FIG. 1 may be used in a magnetic data storage device such as a hard disk drive. Generally, first and second read transducers 102, 103 are housed at a trailing edge of a slider 106, also sometimes referred to as a reader, read/write head, etc. More than two read transducers may be used. The first and second read transducers 102, 103 include magnetoresistive stacks, such as giant magnetoresistive (GMR) stacks, tunneling magnetoresistive (TMR) stacks, etc. The slider 106 is coupled to arm 108 by way of a suspension 110 that allows some relative motion between the slider 106 and arm 108. In addition to the read transducers 102, 103, the slider 106 may include one or more write transducers (not shown), such as a write pole and coil. When the slider 106 is located over surface 112 of a magnetic disk 114, a flying height is maintained between the slider 106 and surface 112 by a downward force of arm 108. This downward force is counterbalanced by an air cushion that exists between the surface 112 and a media-facing surface 116 of the slider 106 when the disk 114 is rotating.

Changes in local magnetic field caused by the moving disk 114 induce a change in resistance of the read transducers 102, 103. The read transducers are coupled to a preamplifier 120 by way of signal lines 118. Generally, the preamplifier 120 amplifies and conditions the analog signals (which may include multiple signals) received via signal lines 118. The preamplifier 120 may also provide bias voltages to the read transducers to achieve a desired electrical operating point. The amplified signals received via the preamplifier 120 are used for other processing modules such as decoder 122. The decoder 122 determines a digital output from the analog signals, the digital output being used by a host via host interface 124, as well as other system components (not shown). The decoder 122 may utilize a multi-dimensional decoding algorithm to simultaneously process signals from the two or more proximately-located read transducers 102, 103. The processing of the signals and data is generally managed by a controller 126, which may include a microprocessor and/or other logic circuits.

As shown in FIG. 1, the first and second read transducers 102, 103 are offset from one another in a down-track direction, and may also be offset in a cross-track direction. This corresponds to stacked configuration of the read transducers 102, 103, wherein one of the read transducers is layered upon the other during manufacture. An example of a reader 200 with stacked read transducers according to an example embodiment is shown in the perspective view of FIG. 2.

The reader 200 is shown as cut away near a media-facing surface 202 of the reader 200, with layers above reader stack 204 being further cut away. The reader 200 is formed by depositing layers on a substrate. In this example, reader stack 206 is formed before the read stack 204, and so the reader stacks 204, 206 are referred to as top and bottom reader stacks. The top and bottom reader stacks 204, 206 are offset relative to each other in a downtrack direction (y-direction in the illustrated coordinate system), and may be aligned with each in a crosstrack direction (x-direction in the illustrated coordinate system). For example, the stacks 204, 206 may share a common centerline 209 that runs in the downtrack direction.

The top and bottom reader stacks 204, 206 are magnetoresistive sensors that include a stack of material layers, such as free layer, pinning layer, fixed layer, etc. The type and arrangement of layers may vary depending on the type of sensor, e.g., GMR, TMR, etc. The top and bottom reader stack 204, 206 are disposed between a top shield 212 and bottom shield 214, the former being shown cut away. In some embodiments, the top and bottom shields 212, 214 include respective synthetic antiferromagnetic (SAF) layers. For example, the top and bottom shields 212, 214 may include a single SAF layer, or multiple layers of SAF and antiferromagnetic (AFM) materials.

A middle shield 216 is located between the top and bottom reader stacks 204, 206. The middle shield 216 may be configured as single or multiple layers. In this example, the middle shield 216 includes top and bottom portions 216a-b separated by an isolation layer 216c. The isolation layer 216c may provide at least electrical isolation between the top and bottom portions 216a-b. In other arrangements, no isolation layer may be used, or an intermediate layer that is electrically conductive may be used. The top and bottom portions 216a-b of the middle shield 216 are respectively coupled to the top and bottom reader stacks 204, 206. Electrical leads/contacts (not shown) are coupled to the middle shield 216, as well as to the top and bottom shields 212, 214. These leads electrically connect the top and bottom reader stacks 204, 206 to sensing circuitry signal lines, e.g., preamplifier, decoder. As will be described in greater detail below, the reader stacks 204, 206 may be connected in a three- or four-terminal arrangement.

The top and bottom reader stacks 204, 206 are each surrounded in a cross-track direction by left side shields 224, 226, and right side shields 225, 227, respectively. The bottom shield 214, the middle shield 216, and the top shield 212 extend to cover the bottom and top reader stacks 206, 204 and the respective side shields 224-227 in the crosstrack direction. It will be understood that the diagram of FIG. 2 is presented for purposes of illustration and not limitation, and the shapes and sizes of the various components of the reader 200 may vary from what is shown here.

In some systems, it may be desirable to minimize downtrack spacing between the reader stacks 204, 206. This can, for example, minimize the effects of skew in misaligning the reader stacks 204, 206 over tracks on a recording medium. However, the minimization of spacing will be balanced against the need to ensure adequate magnetic and electrical shielding between the readers, as well as ensuring magnetic stability of the readers. For example, the side shields 224-227 generally apply a magnetic bias field across the reader stacks 204, 206, and so adjacent materials should not cause instability in these fields.

Generally, embodiments described below include a middle shield 216 and side shields 224-227 configured to provide isolation and magnetic stability for the reader stacks 204, 206, while allowing downtrack distance between the reader stacks 204, 206 to be minimized. One thing that these embodiments have in common, as seen in FIG. 2, is that the middle shield 216 extends to cover the top and bottom reader stacks 204, 206 and the respective side shields 224-227 in the cross-track direction. As such, the formation of the reader involves defining the outer dimensions of the bottom reader stack 204 (e.g., mask, mill/etch), forming the middle shield 216, then forming and defining outer dimension of the top reader stack 206.

Because the outer dimensions/shapes of the top and bottom reader stacks 204, 206 are defined in separate operations, the precision of downtrack alignment between the reader stacks 204, 206 is dependent on the ability to align photolithography masks in different steps. This is in contrast to a self-aligned process where the stacks are deposited on one another with a middle shield in-between, then a single process (e.g., mask, mill/etch) is used to define the outer dimensions of both stacks and the middle shield in one operation. While this can ensure precise alignment, the present embodiments may have advantages in some situations, e.g., where a specified cross-track offset between reader stacks is desired.

In FIG. 3, a block diagram shows a view at the media-facing surface of a reader according to an example embodiment. The coordinate system shown in FIG. 3 is analogous to that shown in FIG. 2. Dashed outlines surround first and second reader stacks 300, 302. The reader stacks 300, 302 are arranged from top to bottom in the downtrack direction (y-direction), and so may be referred to as top and bottom reader stacks, respectively. The reader stacks 300, 302 include respective AFM and SAF layers 300a-b, 302a-b as well as other layers (e.g., free layer) in stack portions 300c, 302c. In this example, the stacks' AFM layers 300a, 302a are wider in a crosstrack direction (x-direction) than other layers 300b-c, 302b-c of the stacks 300, 302. In other arrangements, the AFM layers 300a, 302a may have the same cross track width as the other layers 300b-c, 302b-c of the stacks 300, 302.

A middle shield 304 is located between the top and bottom reader stacks 300, 302. The middle shield 304 may be configured as a multi-layer or single layer structure. In this view, there is no isolation layer shown in the middle shield 304, e.g., such as isolation layer 216c in FIG. 2. As such, the middle shield 304 acts as a common lead/terminal for the top and bottom reader stacks 300, 302.

Top and bottom shields 306, 308 are located respectively above the top reader stack 300 and below the bottom reader stack 302. Both top and bottom shields 306, 308 may include SAF and/or AFM materials. The top shield 306 is a cap layer for the top stack 300, and the bottom shield 308 is a seed layer for the bottom reader stack 302. Side shields 314-317 surround at least part of the reader stacks 300, 302. As indicated by the arrows, the side shields 314-317 provide a magnetic bias to the reader stacks 300, 302. As such, the adjacent layers are configured with the same magnetic orientation. For example, a bottom part of the middle shield 304 may be magnetically coupled to the side shields 316, 317. A similar magnetic alignment exists between at least a bottom part of the top shield 306 and side shields 314, 315. The magnetic pinning ensures stability of the bias fields applied to the reader stacks 300, 302 by the side shields 314-317.

Additional optional features may also be included to ensure stability of the side shields 314-317. As indicated by dashed outlines 318-321, "tabs" may be positioned outside of the side shields 314-317 to enhance magnetic stability. The tabs 318-321 may include permanent magnets and/or AFM materials. The tabs 318-321 may be used one or both of the top or bottom reader stacks 300, 302.

As previously noted, the middle shield 304 (as well as top and bottom shields 306, 308) extends to cover the stacks 300, 302 and associated side shields 314-317. In this context, "covering" refers to a projection of the middle shield 304 on a substrate-parallel plane covering a projection of both the stacks 302, 304 and side shields 314-317 onto the same substrate-parallel plate. Thus, the middle shield 314 can be considered to cover the top stack 300 and top shields 314, 315, whether or not the stack and side shields are formed on top of or below the middle shield 304.

Figure 4:
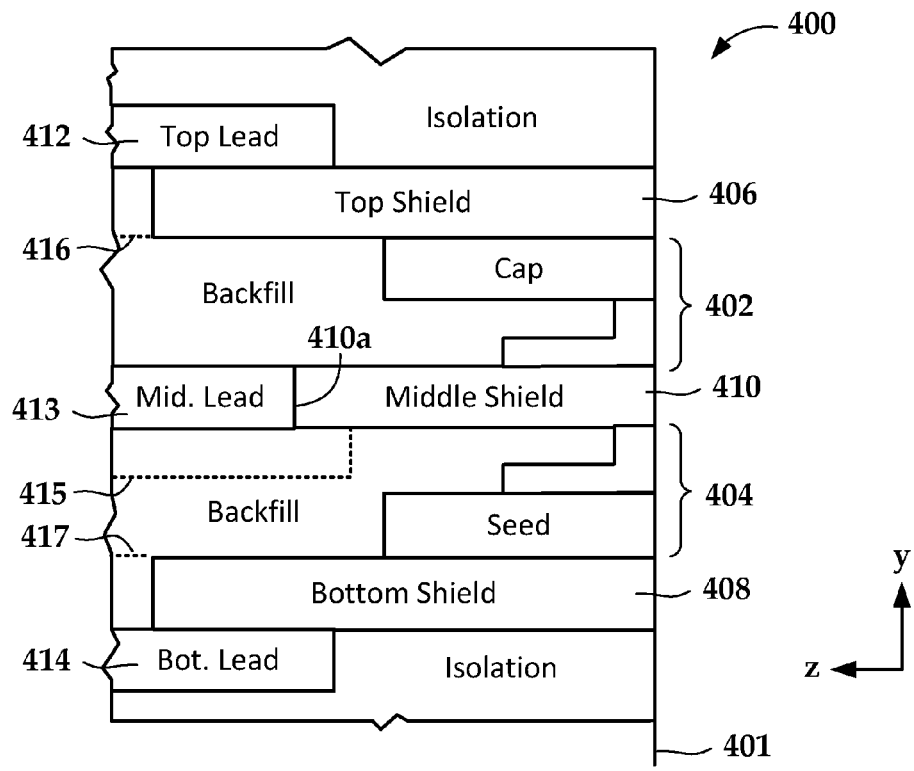
FIG. 4 is side cutaway view of a reader according to an example embodiment.

In FIG. 4, a block diagram shows a cross section of a reader 400 according to an example embodiment. The coordinate system shown in FIG. 4 is analogous to that shown in FIG. 2. The cross section is taken at a media-facing surface 401 through first and second reader stacks 402, 404. The first and second reader stacks 402, 404 are arranged as top and bottom reader stacks in this example. The reader stacks 402, 404 are located between top and bottom shields 406, 408. A middle shield 410 is located between the reader stacks 402, 404.

The reader 400 is a three terminal arrangement, and includes top, middle and bottom leads 412-414. The top lead 412 and bottom lead 414 are formed on a substrate-parallel surface (aligned with xz-plane) of the respective top and bottom shields 406, 408. The middle lead 413 is recessed into a backfill of the middle shield 410 so as to abut an edge 410a of the middle shield 410. The middle lead 413 serves as a common contact for the first and second reader stacks 402, 404. As shown, the middle lead 413 is the same thickness as and co-planer with the middle shield 410. In other embodiments, the middle lead 413 may be thicker or thinner than the middle shield 410, with one or no surfaces being co-planar with a corresponding surface of the middle shield 410. One or both of the top and bottom leads 412, 414 may be formed similar to the middle lead 413, e.g., coplanar with the top and bottom shields 406, 408, as indicated by dashed lines 416, 417.

Forming the middle lead 413 at the edge 410a of the middle shield 410 does not significantly affect topography (e.g., spacing between reader stacks 402, 404) while keeping lead resistance to a minimum. The top and bottom leads 412, 414 can be formed on surfaces of the shields 406, 408 that face away from the reader stacks 402, 404, such that the leads 412, 414 will have minimal impact on topography of the reader 400. It should be noted that the illustrated middle lead 413 can be used with a split middle shield 410, e.g., a middle shield with an isolation layer electrically isolating at least part of top and bottom portions of the middle shield 410. The isolation layer may serve other purposes, e.g., spacing apart the middle shield to increase magnetically isolation between the reader stacks 402, 404. In such a case the middle lead 413 serves as an electrical junction that couples the top and bottom portions.

A middle lead may, in the alternative or in addition, be formed to contact a substrate parallel surface of the middle shield, as indicated by dashed outline 415. In such a case, the middle shield 410 may include features that electrically couple the top and bottom reader stacks 402. For example, the middle shield 410 may be formed of one or more conductive layers. An isolation layer may also be used in the middle shield 410. In such a case, if the middle lead such as 415 only contacts one part of the split middle shield, other features (e.g., vias through the isolation layer) can provide the electrical coupling between top and bottom portions.

Figure 5:
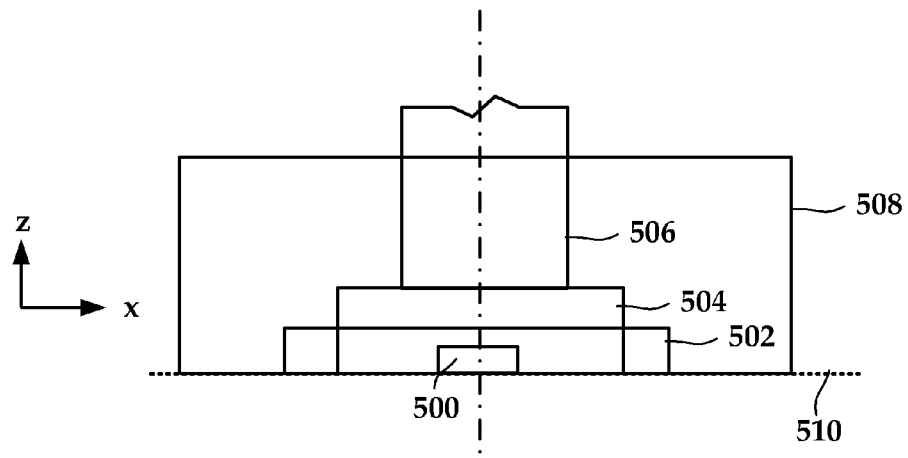
FIG. 5 is a substrate-parallel plane view of a reader according to an example embodiment.

In reference now to FIG. 5, a diagram shows an overlay of reader features on a substrate-parallel plane according to an example embodiment. These features are applied in overlapping layers, as discussed below in greater detail. The coordinate system shown in FIG. 5 is analogous to that shown in FIG. 2. The outlines in FIG. 5 give a general indication of orientation and location of some of the reader features. Block 500 represents first and second reader stacks. The reader stacks are crosstrack-aligned in this example, and include respective cap/seed layers as indicated by block 502. Block 504 represents an outline of a middle shield, and block 506 represents a middle lead. Shape 508 represents an outline of the upper/lower shields. After formation of the reader (and other parts of the slider), the reader is cut (e.g., cleaved) and lapped along line 510, thereby forming part of the media-facing surface. In other embodiments, the dimensions of cap/seed layers 502 can be narrower or the same as middle shield 504 in cross-track direction. Generally, the middle shield 504 will be deeper than the cap/seed layers 502 in the z-direction which prevents shorting between lead 506 and cap/seed layers 502 away from the media-facing surface 510.

Figure 6:
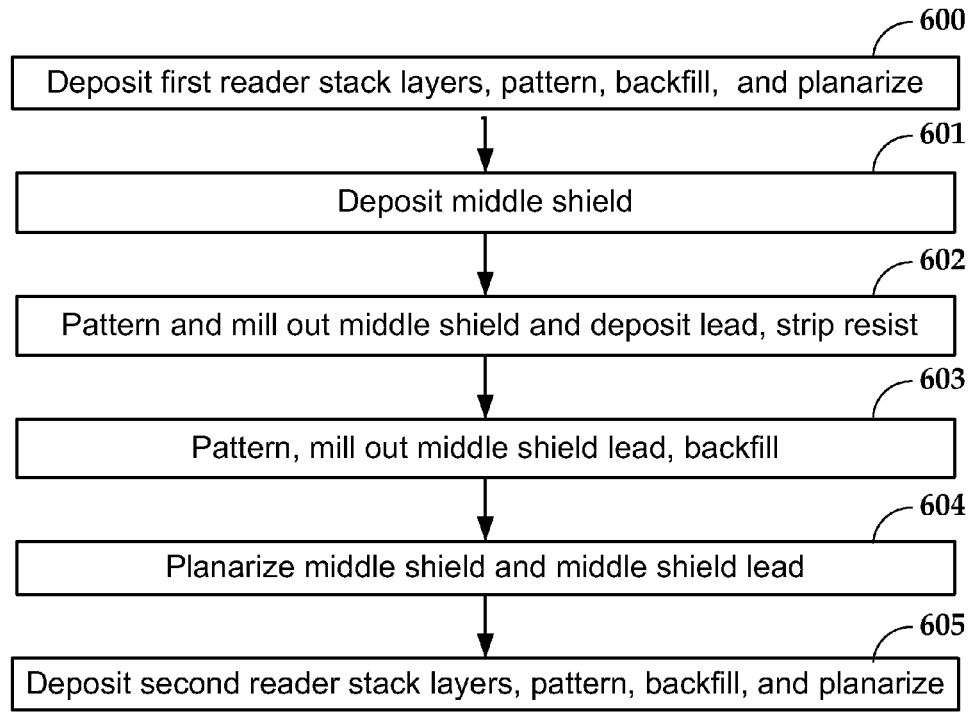
FIG. 6 is a flowchart of a method of forming a reader according to an example embodiment.

In FIG. 6, a flowchart illustrates a method for forming a three-terminal, dual-reader according to an example embodiment. The method involves forming 600 a first (e.g., bottom) reader stack using layer deposition, patterning (e.g., mask and etch), backfilling and planarizing (e.g., chemical-mechanical polishing). This stage of the method may also involve forming first side shields and optional tabs that surround the first reader stack in the crosstrack direction.

A middle shield layer is then deposited 601 on the backfilled reader stack. This may involve depositing multiple layers of material as described above. This also involves depositing the middle lead and performing a photo resist strip. The middle lead is patterned at 603, which includes milling out the middle lead and backfilling. Afterwards, the middle shield and middle lead are planarized 604. A second reader stack can then be formed 605, using similar processes as the first reader stack, including the formation of side shields and tabs. While not shown, the method may also involve forming a first shield on the substrate before the first reader stack is formed, and forming a second shield after the second reader stack is formed.

Figure 7:
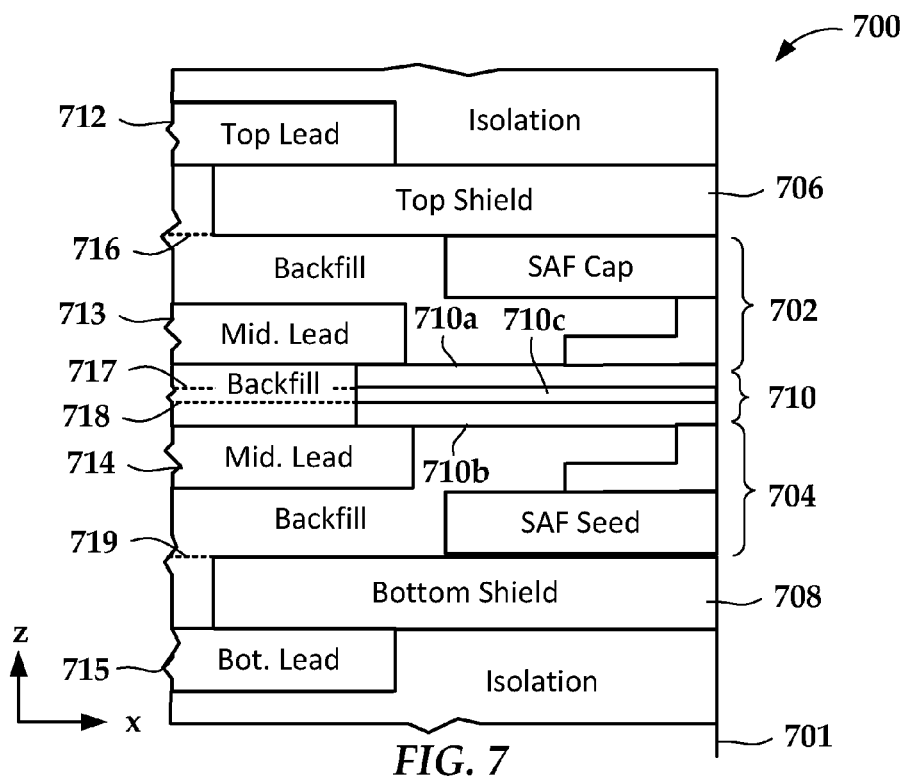
FIG. 7 is side cutaway view of a reader according to another example embodiment.

In FIG. 7, a block diagram shows a cross section of a reader 700 according to another example embodiment. The coordinate system shown in FIG. 7 is analogous to that shown in FIG. 2. The cross section is taken at a media-facing surface 701 through first and second reader stacks 702, 704. The first and second reader stacks 702, 704 are arranged as top and bottom reader stacks in this example. The reader stacks 702, 704 are located between top and bottom shields 706, 708. A middle shield 710 is located between the reader stacks 702, 704. The middle shield 710 is split, having top and bottom portions 710a-b separated by an isolation layer 710c.

The reader 700 is a four-terminal arrangement, and includes top, middle, and bottom leads 712-715. The top lead 712 and bottom lead 715 are formed on a substrate-parallel surfaces (aligned with xz-plane) of the respective top and bottom shields 706, 708, the surfaces facing away from the reader stacks 702, 704. The middle leads 713, 714 are formed on a substrate-parallel surfaces (aligned with xz-plane) of the respective top and bottom portions 710a-b of the middle shield 710. These surfaces face towards the reader stacks 702, 704. As indicated by dashed lines 716-719, one or more of the top, middle, and bottom leads 712-715 may instead or in addition be formed to abut edges of the respective shields 706, 708, 710.

Figure 8:
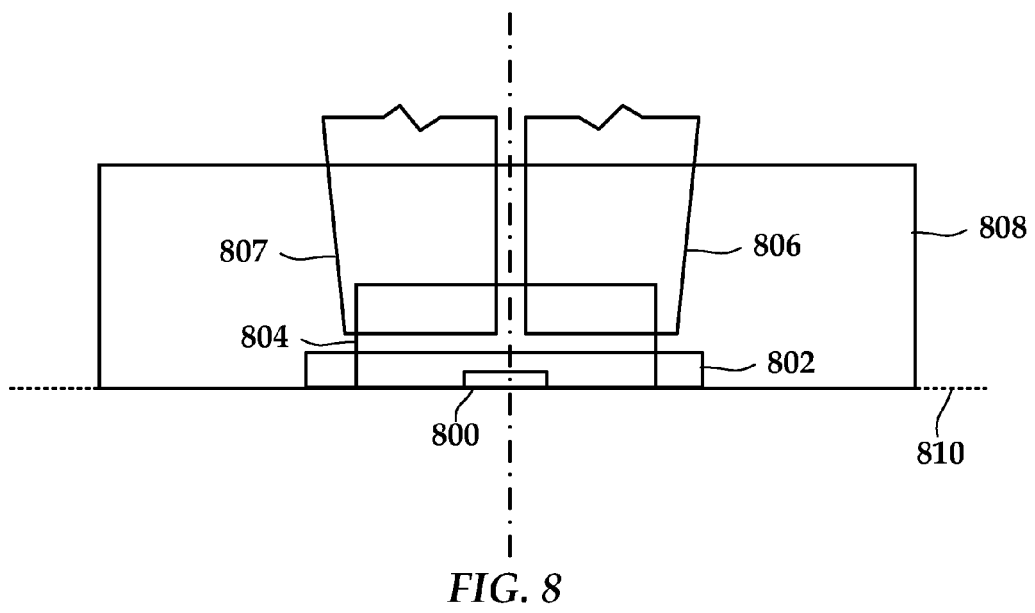
FIG. 8 is a substrate-parallel plane view of a reader according to another example embodiment.

In reference now to FIG. 8, a diagram shows an overlay of reader features on a substrate-parallel plane according to another example embodiment. These features are applied in overlapping layers, as discussed below in greater detail. The coordinate system shown in FIG. 8 is analogous to that shown in FIG. 2. The outlines in FIG. 5 give a general indication of orientation and location of some of the reader features.

Block 800 represents first and second reader stacks. The reader stacks are crosstrack-aligned in this example, and include respective cap/seed layers as indicated by block 802. Block 804 represents an outline of a split middle shield, and blocks 806 and 807 represent first and second middle leads. The split middle shield 804 includes first and second portions coupled respectively to the first and bottom reader stacks 800 and an isolation layer therebetween (see, e.g., shield 710 in FIG. 7). Note that in this example the middle leads 806, 807 do not overlap one another on the substrate parallel plane.

In other embodiments, the leads 806, 807 may be able to overlap each other, e.g., where they are separated by an insulating material. The illustrated embodiment (non-overlapping) may reduce capacitance and signal interactions. The first and second middle leads are coupled to substrate parallel surfaces of the first and second portions of the middle shield. Shape 808 represents upper and lower bulk shields. After formation of the reader (and other parts of the slider that includes the reader), the reader is cut (e.g., cleaved) and lapped along line 810, thereby forming part the media-facing surface.

Figure 9:
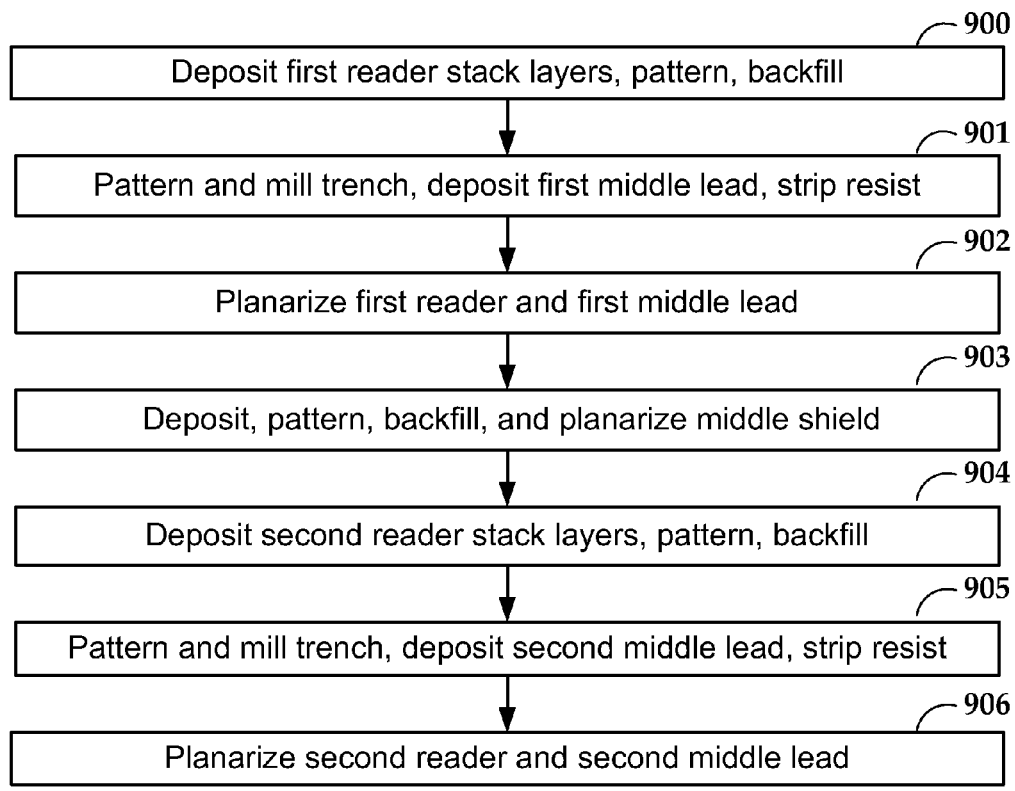
FIG. 9 is a flowchart of a method of forming a reader according to another example embodiment.

In FIG. 9, a flowchart illustrates a method for forming a three-terminal, dual-reader according to an example embodiment. The method involves forming 900 a first (e.g., bottom) reader stack using layer deposition, pattern (e.g., mask and etch), backfilling and planarizing (e.g., chemical-mechanical polishing). This part of the method may also involve forming first side shields and optional tabs that surround the first reader stack in the crosstrack direction.

A first middle lead is formed 901 on the backfilled reader stack. This may involve patterning, milling out a trench in the insulating backfill material (e.g., alumina), and photoresist strip. The first reader and first middle lead are then planarized 902. A middle shield is formed 903, which may involve deposit, pattern, backfill and planarizing. The middle shield may be formed of multiple material layers as described above. A second reader stack can then be formed 904, using similar processes as the first reader stack. This may also include forming side shields and tabs. A second middle lead is then formed 905 on the second reader stack, similar to formation 901 of the first middle lead. The second reader stack and second middle lead are then planarized 906. While not shown, the method may also involve forming a first shield on the substrate, and the first reader stack and first side shields being formed on the first shield. Similarly, a second shield may be formed on the second reader stack and first side shields.

Figure 10:
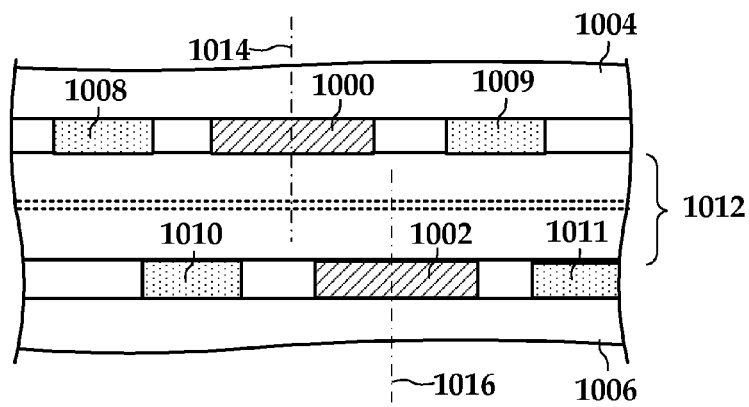
FIG. 10 is media-facing-surface view showing reader alignment according to another example embodiment.

As noted above, the multiple readers may be aligned with each other, e.g., both centered over a common crosstrack reference line. In other embodiments, the readers may be offset from each other in both downtrack and crosstrack directions. An example of crosstrack-offset reader stacks is shown in the block diagram of FIG. 10. First and second reader stacks 1000, 1002 are disposed between first and second downtrack shields 1004, 1006. First side shields 1008, 1009 surround the first reader stack 1000 in a crosstrack direction. Second side shields 1010, 1011 surround the second reader stack 1002 in the crosstrack direction. A middle shield 1012 is located between the first and second reader stacks 1000, 1002 and the first and second side shields 1008-1011. The middle shield 1012 may optionally be split, e.g., including an isolation layer as indicated by the dashed lines.

As indicated by centerlines 1014, 1016, the first and second reader stacks 1000, 1002 are offset from each other in a crosstrack direction (left to right in the figure). The offset distance between centerlines 1014, 1016 may be less than or greater than a separation between tracks (pitch) of the recording media. A similar offset is applied to other components surrounding the reader stacks 1000, 1002, such as side shields 1008-1011 and tabs (not shown). The offset shown in FIG. 10 may be applied to any of the embodiments shown in FIGS. 3-5, 7 and 8. The first and second reader stacks 1000, 1002 may be configured as top and bottom stacks, or vice versa.

Figure 11:
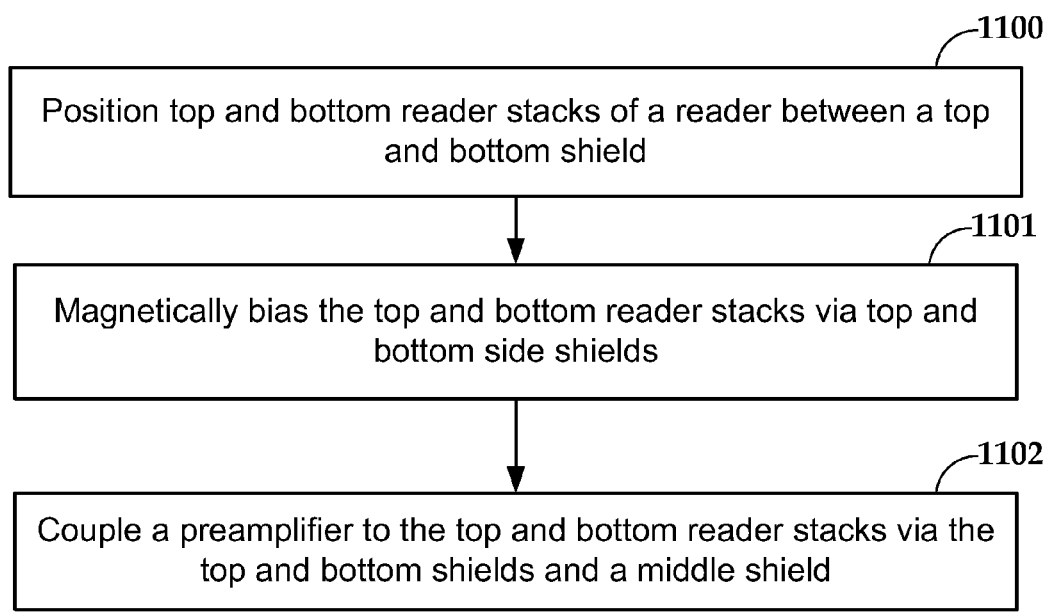
FIG. 11 is a flowchart of method according to another example embodiment.

In reference now to FIG. 11, a flowchart illustrates a method according to an example embodiment. The method involves positioning 1100 top and bottom reader stacks of a reader between a top and bottom shield. The top and bottom reader stacks are offset relative to each other in a downtrack direction. The top and bottom reader stacks are magnetically biased 1101 via top and bottom side shields that surround the respective top and bottom reader stacks in a crosstrack direction. A preamplifier is coupled 1102 to the top and bottom reader stacks via top and bottom leads and at least one middle lead. The top and bottom leads are coupled to the top and bottom shields, and the at least one middle lead is coupled to a middle shield located between the top and bottom reader stacks and the top and bottom side shields. The method may optionally involve reading a two-dimensional magnetic recording signal from a recording medium via the top and bottom reader stacks.

It will be understood that the concepts described hereinabove may be applied to any number of read transducers, e.g., more than two. The concepts may be similarly applicable to recording systems using multiple writers. For example a slider may include two or more write poles separated from one another in a cross-track and/or down-track direction, and multiple writer heaters may be used to independently adjust clearances of the multiple writer poles.

The use of the terms "first" and "second" describing features above or in the claims below is not intended to be limiting. For example, while examples may be provided where first and second components correspond to top and bottom components, this is not intended to imply all such first and second components described and claimed herein have the same positional relationship. Further, unless otherwise stated, the terms "first" and "second" are not intended to describe, suggest, or imply any relative priority, importance, order of manufacture, order of use, etc.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A reader comprising:
top and bottom reader stacks that are offset relative to each other in a downtrack direction and disposed between a top shield and a bottom shield;
top side shields surrounding the top reader stack in a crosstrack direction;
bottom side shields surrounding the bottom reader stack in the crosstrack direction;
a middle shield between the top and bottom reader stacks and the top and bottom side shields, the middle shield comprising a common electrical conductive path coupled to the top and bottom reader stacks; and
a middle lead coupled to an edge of the middle shield, the middle lead being coplanar with the middle shield, and the edge of the middle shield facing away from a media-facing surface of the reader.

2. The reader of claim 1, wherein the top and bottom shields encompass the top and bottom side shields.

3. The reader of claim 1, wherein the top and bottom reader stacks are aligned with one another in the crosstrack direction.

4. The reader of claim 1, wherein the top and bottom reader stacks are offset from with one another in the crosstrack direction.

5. The reader of claim 1, further comprising top and bottom leads on surfaces of the respective top and bottom shields that face away from the top and bottom reader stacks.

6. A hard disk drive comprising a two-dimensional magnetic recording decoder coupled to the reader of claim 1.

7. A reader comprising:
first and second reader stacks that are offset relative to each other in a downtrack direction and surrounded by a first shield and a second shield in the downtrack direction;
first side shields surrounding the first reader stack in a crosstrack direction;
second side shields surrounding the second reader stack in the crosstrack direction;
a split middle shield between the first and second reader stacks and the first and second side shields, the split middle shield comprising first and second portions coupled respectively to the first and second reader stacks and an isolation layer therebetween; and
first and second middle leads comprising first and second layers that are coupled to substrate-parallel surfaces of the first and second portions of the split middle shield, the first and second substrate-parallel surfaces facing towards the first and second reader stacks, the first and second middle leads non-overlapping on a substrate parallel plane and extending away from a media-facing surface of the reader.

8. The reader of claim 7, wherein the first and second shields encompass the first and second side shields.

9. The reader of claim 7, wherein the first and second reader stacks are aligned with one another in the crosstrack direction.

10. The reader of claim 7, wherein the first and second reader stacks are offset from with one another in the crosstrack direction.

11. The reader of claim 7, further comprising first and second leads on surfaces of the respective first and second shields that face away from the first and second reader stacks.

12. A method comprising:
positioning top and bottom reader stacks of a reader between a top and bottom shield, the top and bottom reader stacks offset relative to each other in a downtrack direction;
magnetically biasing at least one of the top and bottom reader stacks via top and bottom side shields that surround the respective top and bottom reader stacks in a crosstrack direction; and
coupling a preamplifier to the top and bottom reader stacks via:
top and bottom leads coupled to the top and bottom shields; and
a middle lead coupled to a middle shield located between the top and bottom reader stacks and the top and bottom side shields, the middle lead being coplanar with the middle shield and the edge of the middle shield facing away from a media-facing surface of the reader.

13. The method of claim 12, further comprising reading a two-dimensional magnetic recording signal from a recording medium via the top and bottom reader stacks.

14. The method of claim 12, wherein the top shield and the bottom shield comprise synthetic antiferromagnetic multilayer structures.

15. The method of claim 12, further comprising surrounded at least one of the top side shields and the bottom side shields in the crosstrack direction by permanent magnet tabs to enhance magnetic stability of the at least one side shield.

16. The method of claim 12, wherein the top reader stack comprises a first antiferromagnetic layer adjacent the middle shield, the first antiferromagnetic layer extending beyond the top side shields in the crosstrack direction, and wherein the bottom reader stack comprises a second antiferromagnetic layer adjacent the bottom shield, the second antiferromagnetic layer extending beyond the bottom side shields in the crosstrack direction.

17. The reader of claim 1, wherein the top shield and the bottom shield comprise synthetic antiferromagnetic multilayer structures.

18. The reader of claim 1, wherein at least one of the top side shields and the bottom side shields are surrounded in the crosstrack direction by permanent magnet tabs that enhance magnetic stability of the at least one side shield.

19. The reader of claim 1, wherein the top reader stack comprises a first antiferromagnetic layer adjacent the middle shield, the first antiferromagnetic layer extending beyond the top side shields in the crosstrack direction, and wherein the bottom reader stack comprises a second antiferromagnetic layer adjacent the bottom shield, the second antiferromagnetic layer extending beyond the bottom side shields in the crosstrack direction.

* * * * *